(12) United States Patent
Masy et al.

(10) Patent No.: US 9,708,448 B2
(45) Date of Patent: Jul. 18, 2017

(54) METHOD FOR MAKING POLY(BUTYLENE OXIDE) POLYOLS

(71) Applicant: DOW GLOBAL TECHNOLOGIES LLC, Midland, MI (US)

(72) Inventors: Jean-Paul Masy, Destelbergen (BE); Myriam Linke, Terneuzen (NL); David A. Babb, Lake Jackson, TX (US); John W. Weston, Sugarland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/024,096

(22) PCT Filed: Aug. 16, 2014

(86) PCT No.: PCT/US2014/051387
§ 371 (c)(1),
(2) Date: Mar. 23, 2016

(87) PCT Pub. No.: WO2015/047583
PCT Pub. Date: Apr. 2, 2015

(65) Prior Publication Data
US 2016/0215091 A1    Jul. 28, 2016

Related U.S. Application Data

(60) Provisional application No. 61/883,293, filed on Sep. 27, 2013.

(51) Int. Cl.
*C08G 65/26* (2006.01)
*C08G 65/12* (2006.01)
*C08G 65/00* (2006.01)

(52) U.S. Cl.
CPC ......... *C08G 65/12* (2013.01); *C08G 65/2606* (2013.01); *C08G 65/2609* (2013.01); *C08G 65/2663* (2013.01); *C08G 65/2696* (2013.01)

(58) Field of Classification Search
CPC ...................................................... C08G 65/26
USPC ......................................................... 528/412
See application file for complete search history.

(56) References Cited

U.S. PATENT DOCUMENTS 3,941,849 A    3/1976    Herold

FOREIGN PATENT DOCUMENTS

| | | |
|---|---|---|
| CA | 2398276 A | 8/2001 |
| EP | 1785445 B | 10/2013 |
| JP | 06-248069 A | 9/1994 |
| JP | 2001-011483 A | 1/2001 |

OTHER PUBLICATIONS

Anonymnous, "Polyether block-copolymers", Research Disclosure ID 494034, vol. 494, No. 34, Jun. 1, 2005.

*Primary Examiner* — Duc Truong
(74) *Attorney, Agent, or Firm* — Gary C Cohn PLLC

(57) ABSTRACT

1,2-butylene oxide is homopolymerized or randomly copolymerized in the presence of a double metal cyanide catalyst such as a zinc hexacyanocobaltate catalyst complex. The polymers unexpectedly contain significant amounts of monofunctional impurities, which can be partially controlled through selection of polymerization conditions.

6 Claims, No Drawings

METHOD FOR MAKING POLY(BUTYLENE OXIDE) POLYOLS

This invention relates to a method for making poly (butylene oxide) polyols.

Poly(butylene oxide) polyols represent a subset of a broader class of polyether polyols. The polyether polyols are generally made by polymerizing a cyclic ether compound onto an initiator compound. The cyclic ethers most commonly used in polyether polyol production are ethylene oxide and propylene oxide. 1,2-butylene is used less commonly, to produce poly(butylene oxide) polyols. Poly(butylene oxide) polyols are used mostly in limited-volume applications in which highly hydrophobic characteristics are needed.

The initiator compound performs two main functions—to help regulate molecular weight and to establish the "functionality" of the polyether polyol, i.e., number of hydroxyl groups the polyether polyol molecules will have.

Control over the functionality is important because the most important industrial applications for polyether polyols are as precursors for making organic polymers such as polyurethanes. The functionality of the polyol plays a significant role in developing the polymer network and defining its characteristics. Difunctional polyols, i.e., those having exactly two hydroxyl groups, can be used to form high molecular weight polymers without introducing branching points or crosslinking. Polyols containing more than two hydroxyl groups produce branched or crosslinked polymer networks.

By tailoring the functionality of the polyol and the length of its branches, once can adjust the properties of the polymers made from the polyol. This accounts in large part for the great versatility and wide range of properties that have been achieved in the class of polymers known as polyurethanes. Polyurethanes based on these polyether polyols are produced in very large volumes, for applications as diverse as bedding, seat cushions and pillows at one end, to hard and rigid structural materials on the other.

Therefore, control over the functionality of the polyether polyols is very important. Unfortunately, the necessary control over polyether polyol functionality is not straightforward. Polyether polyol products quite often have functionalities different than predicted on the basis of the initiator compounds.

Although ethylene oxide, propylene oxide and 1,2-butylene oxide all polymerize through a ring-opening mechanism, they each behave differently and somewhat idiosyncratically, leading to large differences in the products.

Ethylene oxide, for example, polymerizes very efficiently in a base-catalyzed (anionic) polymerization in the presence of an initiator compound. Under those conditions, it engages in very few side-reactions, and as a result the product has a predictable molecular weight and a narrow polydispersity (meaning that the range of molecular weights is mostly in a narrow range). The functionality of the product is very close to that which is anticipated based on the choice of initiator compound.

Propylene oxide, on the other hand, isomerizes under basic conditions to form allyl alcohol and propenyl alcohol. The alcohol isomers then function as alternative initiator compounds, and become propoxylated. Because these alcohol isomers contain only one hydroxyl group, a monofunctional polyether forms when they are propoxylated. The products of this polymerization process therefore consist of a mixture of products: the intended product, which has the same hydroxyl functionality as the initiator, and a second, monofunctional product. This mixture has an average functionality that can be significantly less than expected on the basis of the initiator compound. The monofunctional products act as chain terminators when this product is used to make polymers. The chain termination caused by these species reduces molecular weight and/or crosslink density, and can have a very large adverse effect on the properties of the polymer.

1,2-butylene oxide behaves still differently. Like propylene oxide, 1,2-butylene oxide forms monofunctional impurities when it is polymerized in an anionic polymerization. In the presence of a strong base, 1,2-butylene oxide isomerizes to from crotyl alcohol (but-2-en-1-ol). Crotyl alcohol can act as a monofunctional initiator, and for that reason some monofunctional impurities form during base-catalyzed polymerizations of 1,2-butylene oxide. However, the amount of monofunctional impurities is much smaller than in propylene oxide polymerizations, because of an additional side reaction. A crotyl ether group, which forms when crotyl alcohol reacts with 1,2-butylene oxide or other alkylene oxide, can deprotonate. This deprotonation reaction leads to the formation of a molecule of butadiene, which breaks off from the end of the polymer chain, forming in its place a terminal hydroxyl group. This reaction is shown schematically as follows:

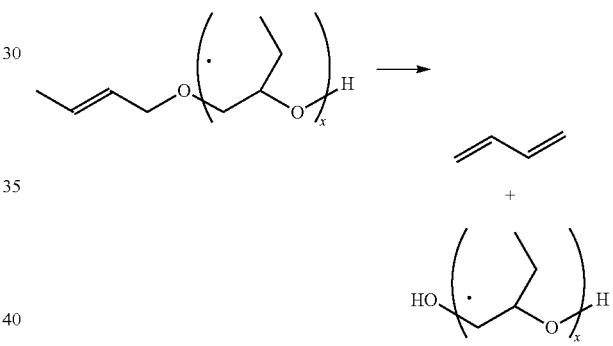

The conversion of the terminal crotyl ether group to a hydroxyl group is beneficial, in that an undesirable monofunctional species in this manner becomes difunctional. However, the formation of butadiene is detrimental in several respects. It represents wasted raw material, which is quite significant economically because 1,2-butylene oxide is quite expensive relative to butadiene. The value of the butadiene is so low that it is usually more economical to simply flare it off rather than to incur the expense of capturing and purifying it. Butadiene is highly flammable and has been associated with human health concerns, and therefore there is a strong desire to remove it from the product. This leads to added production costs.

Double metal cyanide (DMC)-catalyzed methods have arisen as an alternative to base-catalyzed anionic polymerizations. DMC catalysts potentially offer very distinct advantages. They offer fast polymerization rates. Unlike basic catalysts, which must be removed from the product, DMC catalyst residues in most cases can be left in the product. This results in a significant reduction in production costs. Another important benefit of DMC catalysts in propylene oxide polymerization is a very substantial reduction in monofunctional polyether formation.

However, DMC catalysts have found little use outside of homopolymerizing propylene oxide or copolymerizing propylene oxide with minor amounts ethylene oxide. The reason for this the different alkylene oxides polymerize idiosyncratically with DMC catalysts, just as they do in anionic polymerization processes.

Ethylene oxide, for example, polymerizes very rapidly, but does not add onto many initiator compounds in the presence of DMC catalysts. As a result, there is little control over molecular weight and functionality. Instead, ethylene oxide tends to polymerize to form extremely high molecular materials when DMC catalysts are used.

Although much of the patent literature concerning DMC catalysis mentions 1,2-butylene oxide as an alkylene oxide which can be polymerized using those catalyst, virtually no examples of such polymerizations are described in the literature. This may be due to the fact that 1,2-butylene oxide does not form significant quantities of monofunctional species when anionically polymerized under conventional basic conditions, so much of the impetus that drove the adoption of DMC catalysis into making poly(propylene oxide) does not exist in the case of 1,2-butylene oxide polymerization. JP H6-248069 (1994) contains examples of propylene oxide copolymerized with small amounts of 1,2- or 2,3-butylene oxide. The resulting polyethers contain about 5% or less of polymerized butylene oxide.

Therefore, the polymerization behavior of 1,2-butylene oxide in the presence of a polyfunctional initiator compound and a DMC catalyst is heretofore unknown.

This invention is in one aspect a process for producing poly(1,2-butylene oxide) polymers, comprising polymerizing 1,2-butylene oxide or a mixture of at least 50% by weight 1,2-butylene oxide and up to 50% by weight of a copolymerizable alkylene oxide in the presence of a double metal cyanide catalyst and in the presence of a hydroxylic initiator compound to form a polymer or copolymer of 1,2-butylene oxide having at least one block of homopolymerized or randomly copolymerized 1,2-butylene oxide having a number average weight of at least 500 atomic mass units.

Mass of a block in atomic mass units is equivalent to the same number of grams of such block per mole of the poly(1,2-butylene oxide) polymer.

Applicants have found that when 1,2-butylene oxide is homopolymerized using a DMC catalyst, very little butadiene is produced. This is a distinct advantage over the conventional anionic polymerization of 1,2-butylene oxide. However, the product very surprisingly contains a significant amount of monofunctional species. This result is exactly contrary to what is seen when propylene oxide is polymerized with those catalysts, and is quite unexpected in view of the experience with propylene oxide polymerization. The formation of monofunctional species is of course a very substantial disadvantage for the reasons discussed above.

Applicants have further discovered that the amount of monofunctional species can be controlled and somewhat minimized by the selection of certain parameters during the polymerization, in particular the polymerization temperature and the level of DMC catalyst. Therefore, in certain embodiments, this invention is a process for producing poly(1,2-butylene oxide) polymers, comprising polymerizing 1,2-butylene oxide or a mixture of at least 50% by weight 1,2-butylene oxide and up to 50% by weight of a copolymerizable alkylene oxide at a polymerization temperature of 90 to 160° C. in the presence of a hydroxylic initiator compound and enough of a zinc hexacyanocobaltate catalyst complex to provide a cobalt concentration of 1 to 6 parts per million in the product, to form a polymer or copolymer of 1,2-butylene oxide having at least one block of homopolymerized or randomly copolymerized 1,2-butylene oxide, said at least one block having a number average weight of 800 to 2500 atomic mass units, wherein the polymer or copolymer contains no more than 25 microequivalents per gram of monofunctional, unsaturated species.

In other specific embodiments, this invention is a process for producing poly(1,2-butylene oxide) polymers, comprising polymerizing 1,2-butylene oxide or a mixture of at least 50% by weight 1,2-butylene oxide and up to 50% by weight of a copolymerizable alkylene oxide at a polymerization temperature of 90 to 160° C. in the presence of a hydroxylic initiator compound and enough of a zinc hexacyanocobaltate catalyst complex to provide a cobalt concentration of 1 to 6 parts per million in the product, to form a polymer or copolymer of 1,2-butylene oxide having at least one block of homopolymerized or randomly copolymerized 1,2-butylene oxide, said at least one block having a number average weight of 2501 to 4500 atomic mass units, wherein the polymer or copolymer contains no more than 75 microequivalents per gram of monofunctional, unsaturated species.

In another aspect, this invention is a polymer or copolymer of 1,2-butylene oxide having at least one block of homopolymerized 1,2-butylene oxide having a number average weight of 800 to 4500 atomic mass units and/or at least one block of randomly copolymerized 1,2-butylene oxide having a number average weight of 800 to 4500 atomic mass units which randomly copolymerized block contains at least 50 weight percent polymerized 1,2-butylene oxide, wherein the polymer or copolymer contains 1 to 6 parts per million of cobalt residue from a zinc hexacyanocobaltate catalyst complex and no more than 75 microequivalents per gram of monofunctional, unsaturated species. In some embodiments, such a polymer or copolymer has at least one block of homopolymerized 1,2-butylene oxide having a number average weight of 2501 to 4500 atomic mass units and/or at least one block of randomly copolymerized 1,2-butylene oxide having a number average weight of 2501 to 4500 atomic mass units which randomly copolymerized block contains at least 50 weight percent polymerized 1,2-butylene oxide. In other embodiments, such a polymer or copolymer has at least one block of homopolymerized 1,2-butylene oxide having a number average weight of 800 to 2500 atomic mass units and/or at least one block of randomly copolymerized 1,2-butylene oxide having a number average weight of 800 to 2500 atomic mass units, which randomly copolymerized block contains at least 50 weight percent polymerized 1,2-butylene oxide, and the polymer or copolymer contains no more than 25 microequivalents per gram of monofunctional, unsaturated species.

In some embodiments of the invention, 1,2-butylene oxide is homopolymerized. By "homopolymerized", it is meant that the 1,2-butylene oxide is polymerized by itself to form a polymer having at least one poly(1,2-butylene oxide) block having a number average weight of at least 500 atomic mass units.

In other embodiments, 1,2-butylene oxide is randomly or pseudo-randomly copolymerized with up to 50% by weight, based on total weight of monomers, with one or more copolymerizable monomers to form polymer having at least one random or pseudo-random copolymer block having a weight of at least 500 atomic mass units. Random or pseudo-random polymerization is performed in the simultaneous presence of 1,2-butylene oxide and the other monomer(s). If randomly or pseudo-randomly copolymerized, the mixture of monomer preferably contains at least 75%, more preferably at least 90% and still more preferably at least 95% by weight 1,2-butylene oxide.

The block or blocks of homopolymerized or copolymerized 1,2-butylene oxide may have a number average weight of up to 10,000 atomic mass units. In some embodiments, they have a number average weight of 800 to 4000, 800 to 2500 or 2501 to 4000 atomic mass units. When the product is a polyol intended for use in polyurethane applications, the blocks preferably have number average weights of at least 500, more preferably at least 750, and still more preferably at least 800, up to 3000, more preferably up to 2500, still more preferably up to 2000 and even more preferably up to 1500 atomic mass units.

In addition to the blocks of homopolymerized or copolymerized 1,2-butylene oxide blocks, the polymer may contain one or more other blocks. Examples of such blocks are blocks of poly(ethylene oxide), poly(propylene oxide), randomly copolymerized ethylene oxide and propylene oxide, and the like. It is often desirable, for example, to "activate" the double metal cyanide catalyst by exposing it to a small amount of propylene oxide under polymerization conditions. This can form one or more short poly(propylene oxide) blocks in the polymer. It may in some cases also be desirable to form one or more poly(ethylene oxide) blocks in the polymer to, for example, make the polymer more hydrophilic and/or to form terminal primary hydroxyl groups.

The polymerization is conducted in the presence of an initiator compound or compounds that contain one or more hydroxyl groups. The purpose of the initiator compound(s) is to define the functionality (number of hydroxyl groups per molecule) and to control molecular weight.

The initiator can have as few as one and as many as eight or more hydroxyl groups per molecule. For most polyurethane applications, preferred initiators have 2 to 6, more preferably 2 to 4 and especially 2 to 3 hydroxyl groups.

The initiator can have a hydroxyl equivalent weight from 9 to 6000 grams/mole or more. It is generally preferred that the initiator is a liquid under the conditions of the polymerization reaction. For making polyurethanes, a preferred hydroxyl equivalent weight for the initiator is about 20 to 2000, more preferably about 25 to 500 and still more preferably about 25 to 125 grams/mole.

Examples of initiator compounds include methanol, ethanol, 1-propanol, 2-propanol, n-butanol, sec-butanol, t-butanol, 1-pentanol, 1-hexanol, ethylene glycol, 1-2-propane diol, 1,3-propane diol, 1,4-butane diol, 1,6-hexane diol, diethylene glycol, triethylene glycol, dipropylene glycol, tripropylene glycol, glycerin, trimethylolpropane, trimethylolethane, penterythritol, erythritol, sorbitol, sucrose, mannitol, phenol and polyphenolic initiators such as bisphenol A or 1,1,1-tris(hydroxyphenyl)ethane, as well as alkoxylates of any of the foregoing. Such alkoxylates preferably have hydroxyl equivalent weights up to 500 and more preferably up to 125 grams/mole.

The initiator may be neutralized with or contain a small amount of an acid, particularly if the initiator is prepared in the presence of a base (as is often the case with glycerin). If an acid is present, it may be present in an amount of from about 10 to 100 ppm, based on the weight of the initiator, as described in U.S. Pat. No. 6,077,978. Alternatively, the acid may be used in somewhat larger amounts, such as from 100 to 1000 ppm, again based on the weight of the initiator, as described in US Published Patent Application No. 2005-0209438. The acid may be added to the initiator before or after the initiator is combined with the DMC catalyst.

Suitable double metal cyanide catalysts include those described, for example, in U.S. Pat. Nos. 3,278,457, 3,278,458, 3,278,459, 3,404,109, 3,427,256, 3,427,334, 3,427,335 and 5,470,813. Some suitable DMC catalysts can be represented by the formula

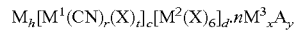

$$M_h[M^1(CN)_r(X)_t]_c[M^2(X)_6]_d \cdot nM^3_xA_y$$

wherein M and $M^3$ are each metals; $M^1$ is a transition metal different from M, each X represents a group other than cyanide that coordinates with the $M^1$ ion; $M^2$ is a transition metal; A represents an anion; b, c and d are numbers that reflect an electrostatically neutral complex; r is from 4 to 6; t is from 0 to 2; x and y are integers that balance the charges in the metal salt $M^3_xA_y$, and n is zero or a positive integer. The foregoing formula does not reflect the presence of neutral complexing agents such as t-butanol which are often present in the DMC catalyst complex.

M and $M^3$ each are preferably a metal ion independently selected from the group consisting of $Zn^{2+}$, $Fe^{2+}$, $Co^{+2+}$, $Ni^{2+}$, $Mo^{4+}$, $Mo^{6+}$, $Al^{+3+}$, $V^{4+}$, $V^{5+}$, $Sr^{2+}$, $W^{4+}$, $W^{6+}$, $Mn^{2+}$, $Sn^{2+}$, $Sn^{4+}$, $Pb^{2+}$, $Cu^{2+}$, $La^{3+}$ and $Cr^{3+}$, with $Zn^{2+}$ being preferred.

$M^1$ and $M^2$ are preferably $Fe^{3+}$, $Fe^{2+}$, $Co^{3+}$, $Co^{2+}$, $Cr^{2+}$, $Cr^{3+}$, $Mn^{2+}$, $Mn^{3+}$, $Ir^{3+}$, $Ni^{2+}$, $Rh^{3+}$, $Ru^{2+}$, $V^{4+}$, $V^{5+}$, $Ni^{2+}$, $Pd^{2+}$, and $Pt^{2+}$. Among the foregoing, those in the plus-three oxidation state are more preferred as the $M^1$ and $M^2$ metal. $Co^{+3}$ and $Fe^{+3}$ are even more preferred and $Co^{+3}$ is most preferred.

Suitable anions A include but are not limited to halides such as chloride, bromide and iodide, nitrate, sulfate, carbonate, cyanide, oxalate, thiocyanate, isocyanate, perchlorate, isothiocyanate, an alkanesulfonate such as methanesulfonate, an arylenesulfonate such as p-toluenesulfonate, trifluoromethanesulfonate (triflate) and a $C_{1-4}$ carboxylate. Chloride ion is especially preferred.

r is preferably 4, 5 or 6, preferably 4 or 6, and most preferably 6; t is preferably 0 or 1, most preferably 0. In most cases, r+t will equal six.

A suitable type of DMC catalyst is a zinc hexacyanocobaltate catalyst complex as described, for example, in any of U.S. Pat. Nos. 3,278,457, 3,278,458, 3,278,459, 3,404,109, 3,427,256, 3,427,334, 3,427,335 and 5,470,813. An especially preferred type of DMC catalyst is complexed with t-butanol.

The polymerization is performed by polymerizing the 1,2-butylene oxide or mixture thereof in the presence of the catalyst and initiator compound.

Enough of the DMC catalyst is used to provide a reasonable polymerization rate, but it is generally desirable to use as little of the double metal cyanide catalyst as possible consistent with reasonable polymerization rates, as this both reduces the cost for the catalyst and, if the catalyst levels are low enough, can eliminate the need to remove catalyst residues from the product. The amount of DMC catalyst complex may be enough to provide 1 to 6 parts by weight of the transition metal(s) ($M^1$ and $M^2$ in the foregoing formula) per million parts by weight of the polyether product (ppm). The amount of DMC catalyst complex may be enough to provide 1 to 3 ppm of the transition metal(s), based on the weight of the polyether product. The preferred transition metal is cobalt, is in the case of a zinc hexacyanocobaltate catalyst, in which case the amount DMC catalyst preferably is sufficient to provide 1 to 6, preferably 1 to 3, parts per million by weight cobalt in the product. This preferred catalyst level provides a good balance between polymerization rates, low unsaturation in the product, product viscosity and catalyst cost.

Applicants have unexpectedly found that polymerization temperature plays an important role in the formation of monofunctional species and product viscosity when 1,2-butylene oxide is polymerized with a double metal cyanide catalyst. Unsaturation tends to increase greatly when the polymerization temperature exceeds 160° C. Therefore, the polymerization preferably is performed at a temperature of 90 to 160° C. A more preferred temperature is 100 to 140° C. and a still more preferred temperature is 110 to 140° C.

The polymerization reaction usually is performed at superatmospheric pressure, but can be performed at atmospheric pressure or even subatmospheric pressures.

The polymerization reaction can be performed batchwise, semi-continuously (including with continuous addition of starter as described in U.S. Pat. No. 5,777,177) or continuously.

In a batch polymerization, the DMC catalyst complex, the 1,2-butylene oxide (or oxide mixture) and initiator are charged to a reaction vessel and heated to the polymerization temperature until the desired molecular weight is obtained.

In a semi-batch process, the DMC catalyst complex and initiator are combined. A polyether monol or polyether polyol corresponding to the product of the polymerization, and/or a poly(1,2-butylene oxide) homopolymer or copolymer of intermediate molecular weight between that of the initiator and product, may be present if desired. A small amount of 1,2-butylene oxide and/or 1,2-propylene oxide is introduced into the reaction vessel and the contents of the vessel are heated if necessary to the polymerization temperature. When the DMC catalyst complex has become activated (typically as indicated by a drop of internal reactor pressure), 1,2-butylene oxide or a mixture of 1,2-butylene oxide and one or more other monomers as described before is fed to the reactor under polymerization conditions. The alkylene oxide feed is continued until enough has been consumed to reach the target product molecular weight. Additional DMC catalyst may be added during the course of the oxide addition. In a semi-batch process, the entire amount of initiator is commonly added at the start of the process. After the oxide feed is completed, the reaction mixture may be cooked down at the polymerization temperature to consume any remaining oxide.

A continuous polymerization includes the continuous addition of at least the catalyst, the oxide(s) and starter, and continuous removal of product. A continuous process is generally conducted by establishing steady-state concentrations (within the operational capabilities of the polymerization equipment) of catalyst, initiator, oxide(s) and polymerizate under polymerization conditions in a continuous reactor such as a loop reactor or a continuous stirred tank reactor. The "polymerizate" is a mixture of polyethers that have molecular weights greater than that of the initiator and up to that of the intended product. Additional DMC catalyst complex, initiator and oxide(s) are then continuously added to the reactor. These can be added as a single stream, as separate components, or in various sub-combinations. A product stream is continuously withdrawn from the reactor. The rates of the additional stream(s) and product streams are selected to maintain steady-state conditions in the reactor (within the capabilities of the equipment), and to produce a product having a desired molecular weight.

The product stream withdrawn from the continuous reactor may be cooked down for some period of time to allow any unreacted oxides in that stream to be consumed to low levels.

In a semi-batch or continuous process as described above, the oxide(s) may be fed to the reactor on demand by continuously pressurizing the reactor with the oxide to a predetermined internal reactor pressure. The concentration of unreacted oxide(s) in the liquid phase in a semi-batch or continuous reactor preferably is maintained at a level of from 0.5% to 20%, more preferably from 0.5% to 10% by weight, most preferably from 1 to 5% by weight, during the oxide feed. Lower oxide concentrations have been found to have a small beneficial effect on the unsaturation levels and viscosity of the product.

The polymerization reaction can be performed in any type of vessel that is suitable for the pressures and temperatures encountered. In a continuous or semi-continuous process, the vessel should have one or more inlets through which the oxide(s) and additional initiator compound can be introduced during the reaction. In a continuous process, the reactor vessel should contain at least one outlet through which a portion of the partially polymerized reaction mixture can be withdrawn during the course of the reaction. A tubular reactor that has multiple points for injecting the starting materials, a loop reactor, and a continuous stirred tank reactor (CTSR) are all suitable types of vessels for continuous or semi-continuous operations. The reactor should be equipped with a means of providing or removing heat, so the temperature of the reaction mixture can be maintained within the required range. Suitable means include various types of jacketing for thermal fluids, various types of internal or external heaters, and the like. A cook-down step performed on continuously withdrawn product is conveniently conducted in a reactor that prevents significant back-mixing from occurring. Plug flow operation in a pipe or tubular reactor is a preferred manner of performing such a cook-down step.

The polymerization may be conducted in the presence of certain metal promoter compounds, such as those described in WO 2012/091968 as "MG3-15LA compounds". An MG3-15LA compound as described in WO 2012/091968 is a separately added ingredient, which is not present during the preparation (i.e., the precipitation step) of the DMC catalyst complex. The MG3-15LA compound contains a magnesium, Group 3-Group 15 metal or lanthanide series metal ion bonded to at least one alkoxide, aryloxy, carboxylate, acyl, pyrophosphate, phosphate, thiophosphate, dithiophosphate, phosphate ester, thiophosphate ester, amide, siloxide, hydride, carbamate or hydrocarbon anion. The MG3-15LA compound is devoid of halide anions. The MG3-15LA compound tends to decrease the time needed to activate the DMC catalyst complex, often greatly accelerates the polymerization rate, and can permit the use of smaller quantities of the DMC catalyst.

If used, enough of the MG3-15LA compound is present to provide at least 0.0005 moles of the magnesium, group 3-group 15 metal or lanthanide series metal per gram of the DMC catalyst complex. A preferred amount is enough to provide at least 1 mole, preferably at least 5 moles, up to 50 moles, preferably up to 20 moles, of the group 3-group 15 metal or lanthanide series metal per mole of the M metal in the DMC catalyst complex.

The product obtained in any of the foregoing processes may contain up to 0.5% by weight, based on the total weight, of unreacted oxide(s); small quantities of the initiator compound and low molecular weight alkoxylates thereof; and small quantities of other organic impurities and water. Most or all of the volatile impurities should be flashed or stripped from the polyether. The product typically contains catalyst residues and residues of the MG-15LA compound if one is used. It is typical to leave these residues in the product, but these can be removed if desired.

The process of the invention is useful for preparing polyethers having at least one block of homopolymerized or copolymerized 1,2-butylene oxide having a weight as described before. The polyether may include one or more other blocks, in addition to the block(s) of homopolymerized or copolymerized 1,2-butylene oxide. These include, for example, one or more internal poly(propylene oxide) blocks, which may result from the activation of the DMC catalyst; one or more internal or external poly(ethylene oxide) blocks, and the like. Preferably, the product polyether is a liquid or a solid material having a melting temperature of no greater than 50° C.

Polyether polyols produced in accordance with the invention are generally characterized in having usefully low levels of unsaturated species together with usefully low viscosities. Unsaturation levels and viscosity both tend to increase with greater molecular weight of the 1,2-butylene oxide homopolymer or copolymer blocks, but at a given weight of such blocks, the invention provides beneficially low unsaturation and viscosity.

Polyether polyols produced in accordance with the invention are useful for making polyurethanes, among other things. Higher equivalent weight (500-3000 g/equivalent) polyether polyol products are useful in making elastomeric or semi-elastomeric polyurethanes, including noncellular or microcellular elastomers, and flexible polyurethane foams. The flexible polyurethane foams may be made in a slabstock or molding process.

Polyether monols produced in accordance with the invention are useful as surfactants or as industrial solvents, among other uses.

The following examples are provided to illustrate the invention but are not intended to limit the scope thereof. All parts and percentages are by weight unless otherwise indicated.

EXAMPLES 1-9

Examples 1-9 are made using the following general procedure.

72.1 g of tripropylene glycol is combined with a zinc hexacyanocobaltate DMC catalyst and aluminum isopropoxide, and charged to a stirred 1 L Parr reactor. The amount of DMC catalyst is adjusted to give 20 to 50 ppm by weight DMC catalyst (about 2.4 to 6 ppm cobalt) in the product, as indicated in Table 1 below. The amount of aluminum isopropoxide is adjusted to provide 5 to 20 moles of aluminum/mole of zinc in the DMC catalyst, as indicated in Table 1 below. This mixture is dried for 90 minutes at 120° C.

The reactor is heated to the polymerization temperature indicated in Table 1 below and maintained at that temperature during the polymerization process. The heated reactor is pressurized to 20 psig (138 kPa) with propylene oxide. When the reactor pressure drops to 10 psig (69 kPa), the catalyst is considered to have been activated, and additional propylene oxide is added until a total of 77.9 g of propylene oxide has been added. Then, 600 g of 1,2-butylene oxide is added to the reactor, maintaining the reactor pressure such that the concentration of dissolved 1,2-butylene oxide in the liquid phase is in the range of about 2 to 6% as indicated in Table 1. After all the 1,2-butylene oxide is added, the reactor contents are stirred until a constant internal pressure is achieved, which indicates complete polymerization of the 1,2-butylene oxide. The polyethers so produced are diols that have a target number average molecular weight of 2000. The polyethers contain the residue of the tripropylene glycol initiator (weight=190 amu), two internal poly(propylene oxide) blocks each having weights of about 105 amu, and terminal poly(1,2-butylene oxide) blocks each having weights of about 800 amu, as calculated from the masses of the starting materials.

In each case, the product is cooled to room temperature. Unsaturation is measured in each case. A 50/50 by weight mixture of the product and a 0.025M solution of chromium acetylacetonate in acetone-d is placed in a 10 mm NMR tube, and the mixture is analyzed by $C^{13}$ NMR at room temperature, using 4000 scans per data file, a 6 second pulse repetition delay, a spectral width of 25,200 Hz and a file size of 32 data points.

Viscosity is measured at 38° C. on a Brookfield viscometer operating at 10 rpm.

Results are as indicated in Table 1.

TABLE 1

| Ex. | Temp., ° C. | DMC catalyst, as ppm cobalt | Al/DMC mole ratio | Unreacted monomer concentration, ppm | Unsaturation, µeq/gram | Viscosity, cP |
|---|---|---|---|---|---|---|
| 1 | 110 | 2.4 | 20 | 6 | 25 | 241 |
| 2 | 110 | 6 | 20 | 6 | 25 | 245 |
| 3 | 140 | 6 | 5 | 6 | 24 | 222 |
| 4 | 110 | 6 | 5 | 2 | 24 | 254 |
| 5 | 140 | 6 | 5 | 2 | 24 | 218 |
| 6 | 125 | 4.2 | 12.5 | 4 | 23 | 227 |
| 7 | 110 | 6 | 20 | 2 | 23 | 239 |
| 8 | 110 | 2.4 | 5 | 2 | 22 | 231 |
| 9 | 140 | 6 | 20 | 6 | 20 | 265 |

The selection of a polymerization temperature of 110 to 140° C. together with a DMC concentration sufficient to provide 2.4 to 6 parts per million cobalt in the product leads to a low viscosity, 2000 molecular weight product having 25 microequivalents or less of unsaturated monofunctional species per gram of product.

EXAMPLES 10-14

Examples 10-14 are made in the same general manner as Examples 1-9, except more 1,2-butylene oxide is fed into the reactor to produce a target product molecular weight of 4000. The polyethers contain the residue of the tripropylene glycol initiator (weight=190 amu), two internal poly(propylene oxide) blocks each having weights of about 105 amu, and terminal poly(1,2-butylene oxide) blocks each having weights of about 1800 amu, as calculated from the masses of the starting materials. Unsaturation and viscosity are measured as before, with results as indicated in Table 2.

TABLE 2

| Ex. | Temp., ° C. | DMC catalyst, as ppm cobalt | Unsaturation, µeq/gram | Viscosity, cP |
|---|---|---|---|---|
| 10 | 160 | 7.2 | 25 | 235 |
| 11 | 160 | 6 | 25 | 186 |
| 12 | 160 | 7.2 | 23.6 | 197 |
| 13 | 140 | 2.4 | 23.3 | 176 |
| 14 | 160 | 7.2 | 22 | 207 |

Unsaturation levels of 25 microequivalents per gram are obtained in all cases even at polymerization temperatures in the range of 140 to 160° C. The lower polymerization temperature in conjunction with the lowest catalyst level provides the best balance of low unsaturation and low viscosity.

EXAMPLES 15-18

Examples 15-18 are 8000 molecular weight diols made in two steps. The first step is the synthesis of a 2000 MW poly(butylene oxide) intermediate. The second step uses the 2000 MW intermediate as starter to prepare 8000 MW poly(butylene oxide) diols.

A commercially available 425 molecular weight poly (propylene oxide) diol is acidified with 105 ppm of 70% $H_3PO_4$ and charged in a stainless steel reactor. The DMC catalyst (325 mg dry wt.) is dispersed in the diol starter and heated at 160° C. while applying vacuum to the reactor. 218 g of 1,2-butylene oxide are fed at 25 g/min to activate the catalyst. When the reactor pressure declines to less than 4.4 psia (30 kPa), 4945 g of butylene oxide are fed to the reactor with a feed rate of 16 g/min. When the oxide addition is complete, the reactor is maintained at 160° C. for one hour to allow free monomer to react.

1121 g of the resulting intermediate 2000 molecular weight poly(butylene oxide) diol are added to a reactor together with 364 mg of the DMC catalyst and 20 ppm of 70% $H_3PO_4$. The mixture is brought to a polymerization temperature as indicated in Table 3. 183 g of 1,2-butylene oxide are fed at 25 g/minute to activate the catalyst. When the pressure declines to less than 30 kPa, 4696 g of 1,2-butylene oxide are fed to the reactor. When the oxide addition is complete the reactor is maintained at the polymerization for one hour to allow free monomer to react. Unsaturation is measured as before, with results as indicated in Table 3.

TABLE 3

| Example | Polymerization temperature, ° C. | Catalyst concentration, as ppm cobalt | Unsaturation, µeq/gram |
|---|---|---|---|
| 15 | 160 | 8.4 | 77 |
| 16 | 160 | 8.4 | 75 |
| 17 | 140 | 12 | 67 |
| 18 | 140 | 4.8 | 61 |

In these examples, unsaturation levels as low as 61 microequivalents/gram are obtained even when making an 8000 molecular weight diol that has poly(1,2-butylene oxide) blocks having a weight of almost 4000 each. The lower polymerization temperature favors lower unsaturation, as does the lower amount of catalyst.

What is claimed is:

1. A semi-batch or continuous process for producing poly(1,2-butylene oxide) polymers, comprising polymerizing 1,2-butylene oxide or a mixture of at least 50% by weight 1,2-butylene oxide and up to 50% by weight of a copolymerizable alkylene oxide at a polymerization temperature of 110 to 140° C. in the presence of enough of a double metal cyanide catalyst to provide a cobalt concentration of 1 to 6 parts per million in the product and in the presence of a hydroxylic initiator compound having 2 to 6 hydroxyl groups, while maintaining a concentration of unreacted alkylene oxides at 2 to 6% by weight, to form a polymer or copolymer of 1,2-butylene oxide having at least one block of homopolymerized or randomly copolymerized 1,2-butylene oxide having a number average weight of at least 500 atomic mass units and which contains no more than 25 microequivalents per gram of monofunctional, unsaturated species.

2. A poly(1,2-butylene oxide) polymer made in accordance with claim 1.

3. The process of claim 1 wherein said least one block of homopolymerized or randomly copolymerized 1,2-butylene oxide has a number average weight of 800 to 2500 atomic mass units.

4. The process of claim 3 wherein 1,2-butylene oxide is homopolymerized to form at least one block of homopolymerized 1,2-butylene oxide.

5. The process of claim 4 wherein enough of the zinc hexacyanocobaltate catalyst complex is present to provide a cobalt concentration of 1 to 3 parts per million in the product.

6. The process of claim 5 wherein the polymerization temperature is 110 to 120° C.

* * * * *